United States Patent [19]

Asano et al.

[11] Patent Number: 4,966,268

[45] Date of Patent: Oct. 30, 1990

[54] DRIVING POWER TRANSMISSION DEVICE

[75] Inventors: Hiroaki Asano, Okazaki; Kyosuke Haga, Anjyo; Isao Ito, Iwakura, all of Japan

[73] Assignees: Toyoda Koki Kabushiki Kaisha, Kariya; Toyota Jidosha Kabushiki Kaisha, Toyota, both of Japan

[21] Appl. No.: 374,143

[22] Filed: Jun. 30, 1989

[30] Foreign Application Priority Data

Jul. 7, 1988 [JP] Japan ................. 63-169320

[51] Int. Cl.$^5$ ............................. F16D 31/00
[52] U.S. Cl. .................. 192/58 C; 192/85 AA; 192/103 F; 74/650; 180/248
[58] Field of Search ............ 192/58 C, 70.12, 85 AA, 192/85 R, 103 F; 74/711, 650; 180/248

[56] References Cited

U.S. PATENT DOCUMENTS

| | | | |
|---|---|---|---|
| 3,490,312 | 1/1970 | Seitz et al. | 74/711 |
| 3,628,399 | 12/1971 | Seitz et al. | 74/711 |
| 4,012,968 | 3/1977 | Kelbel | 74/711 |
| 4,031,780 | 6/1977 | Dolan et al. | 74/711 |

FOREIGN PATENT DOCUMENTS 176117 4/1983 Japan .

Primary Examiner—Leslie A. Braun
Assistant Examiner—Andrea Pitts
Attorney, Agent, or Firm—Oblon, Spivak, McClelland, Maier & Neustadt

[57] ABSTRACT

A driving power transmission device having a clutch provided between a first shaft and a second shaft relatively rotatable to each other for transmitting a driving power is provided, wherein a housing to which the first shaft is connected and a piston provided in the housing for actuating the clutch define a cylindrical space in order to receive a plurality of blades rotatable with the second shaft. High viscous fluid is filled within the cylindrical space defined by the housing and the piston. Each of the blades has a convexly curved side surface and a concavely curved side surface located at opposite sides in rotational direction. When the first shaft rotates faster than the second shaft, the convexly curved side surfaces of the blades compulsorily displaces the high viscous fluid within the space in order to generate a pressure actuating the clutch through the piston. In this forward torque transmission, the tranmissive torque becomes relatively large. When the first shaft rotates slower than the second shaft, the concavely curved side surfaces of the blades compulsorily displace the high viscous fluid in order to generate a pressure for actuating the clutch. In this reverse torque transmission, the transmissive torque becomes smaller than that in the forward torque transmission.

6 Claims, 5 Drawing Sheets

DRIVING POWER TRANSMISSION DEVICE

BACKGROUND OF THE INVENTION

1. Field of the Invention

The present invention relates to a device for transmitting driving power between two axes, which are relatively rotatable to each other.

2. Discussion of the Prior Art

While the basic function of a driving power transmission device used in a four-wheel drive system is to transmit driving power to rear wheels in response to the rotational speed difference between front wheels and rear wheels, ability of absorbing circulation torque, which occurs in only four-wheel drive vehicles, is also an important function. The circulation torque is a rotational torque, which occurs within a loop constituted by front wheels, a road surface, rear wheels, a propeller shaft, and the driving power transmission device, when rotational speed difference between the front wheels and the rear wheels appears due to running condition of the vehicle. If the rear wheels rotate faster than the front wheels because of the circulation torque, the circulation torque is transmitted from the rear wheels to the front wheels through the propeller shaft and the driving power transmission device, and causes vibration of the propeller shaft which is a cause of booming noise produced in the passenger room. Therefore, the ability of absorbing the circulation torque is one of important functions of such driving power transmission device. Such circulation torque can be absorbed if the rotational torque is not transmitted or is reduced when the rotational torque is transmitted from the rear wheels to the front wheels through the transmission device, i.e. the rear wheels rotate faster than the front wheels.

A driving power transmission device for the well known four-wheel drive vehicle, however, does not have any capability of decreasing the transmissive torque when the rear wheels rotate faster than the front wheels. Accordingly, the driving power transmission device in the prior four-wheel drive system cannot absorb the aforementioned circulation torque.

The circulation torque is also produced when an antilock brake system provided in the vehicle operates, and conflict between the antilock brake system and the driving power transmission device occurs. If the circulation torque is absorbed by the transmission device, the antilock brake system can operate correctly. Therefore, the ability of absorbing the circulation torque is also important in the four-wheel drive vehicle, which is provided with the antilock brake system.

SUMMARY OF THE INVENTION

Accordingly, it is a primary object of the present invention to provide an improved driving power transmission device suitable for use in a four-wheel drive vehicle.

Another object of the present invention is to provide an improved driving power transmission device, in which the circulation torque can be reduced by decreasing transmissive torque when the rotational torque of reverse direction is transmitted from a driven shaft to a drive shaft.

A further object of the present invention is to provide an improved driving power transmission device of the character set forth above which is simple in configuration, reliable in operation and low in manufacturing cost.

Briefly, a driving power transmission device according to the present invention comprises first and second shafts relatively rotatable to each other and clutch means provided between the first and second shafts. The first shaft is connected to a housing in which the clutch means and a piston for actuating the clutch means are received. The housing and the piston define a cylindrical space in order to receive blade means rotatable with the second shaft. High viscous fluid such as silicon oil is filled within the space defined by the housing and the piston. The blade means has a convexly curved side surface and a concavely curved side surface located at opposite sides in the rotational direction. When the first shaft rotates faster than the second shaft, the convexly curved side surface of the blade means compulsorily displaces the high viscous fluid within the space in order to generate a pressure for actuating the clutch means through the piston. In this forward torque transmission, the transmissive torque becomes relatively large. When the first shaft rotates slower than the second shaft, the concavely curved side surface of the blade means compulsorily displaces the high viscous fluid in order to generate a pressure for actuating the clutch means. In this reverse torque transmission, the transmissive torque becomes smaller than that in the forward torque transmission.

With this configuration, the rotational torque transmitted from the second shaft is absorbed in the transmission device, because the transmissive torque is relatively small during the reverse torque transmission. If the device is used for connecting front wheels and rear wheels in such a way that the first shaft is connected to the front wheels and the second shaft is connected to the rear wheels, usual driving power is effectively transmitted to the rear wheels through the device, and the reverse torque transmitted from the rear wheels is absorbed in the device. Accordingly, circulation torque, which occurs due to the rotational speed difference between front wheels and rear wheels, is absorbed in the device, and thereby vibration of the propeller shaft which causes booming noise in the passenger room and conflict with an antilock brake system can be reduced.

BRIEF DESCRIPTION OF THE ACCOMPANYING DRAWINGS

Various other objects, features and many of the attendant advantages of the present invention may be readily appreciated as the same becomes better understood by reference to the following detailed description of the preferred embodiment when considered in connection with the accompanying drawings, wherein like reference numerals designate identical or corresponding parts throughout the several views, and in which.

DETAILED DESCRIPTION OF THE PREFERRED EMBODIMENT

Figure 1:
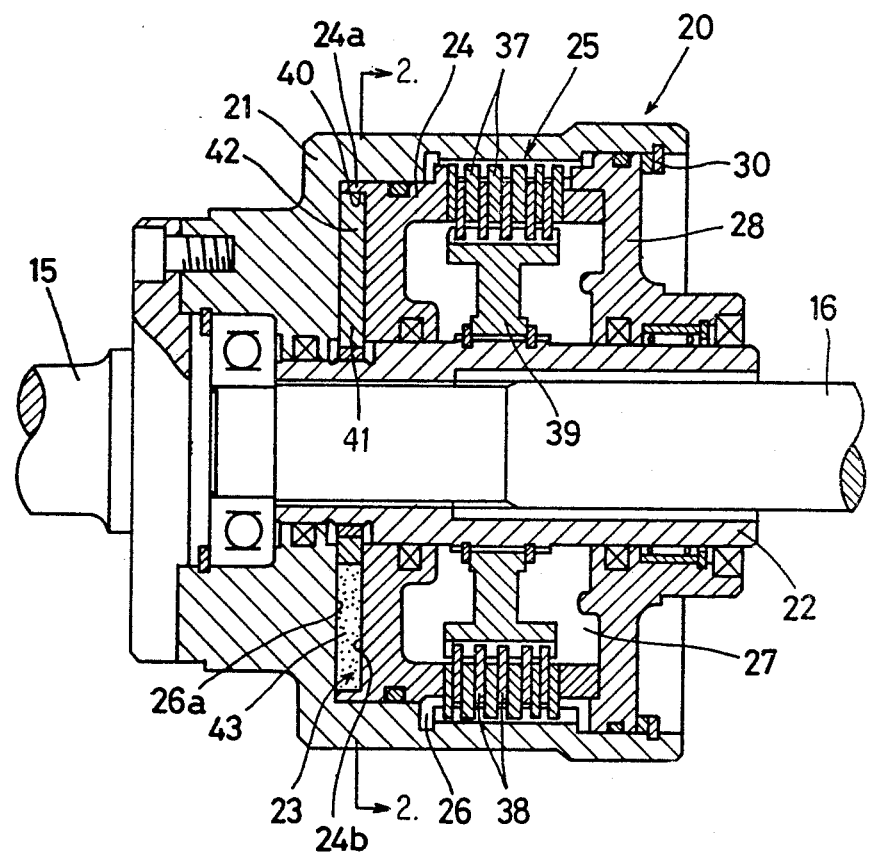
FIG. 1 is a sectional view of a driving power transmission according to the present invention.

Referring now to FIG. 1, a driving power transmission device 20 is shown having a first rotary shaft 15 connectable to front wheels of a four-wheel drive vehicle and a second rotary shaft 16 connectable to rear wheels The driving power transmission device 20 is mainly composed of a housing 21, a cylindrical shaft 22 rotatably supported in the housing 21, a pressure generating section 23 for producing a pressure corresponding to the rotational speed difference between the housing 21 and the cylindrical shaft 22, a piston 24 to which the pressure generated at the pressure generating section 23 is applied, and clutch means 25 which is actuated by the pressing force of the piston 24.

The first rotary shaft 15 is secured to one end of the housing 21, while the second rotary shaft 16 is spline-engaged with the cylindrical shaft 22. The housing 21 is formed with a cylindrical bore 26, which has a flat bottom surface 26a, in order to slidably receive the piston 24 in the bore 26. The piston 24 is spline-engaged with the inside surface of the housing 21 in order to be rotated therewith.

Figure 2:
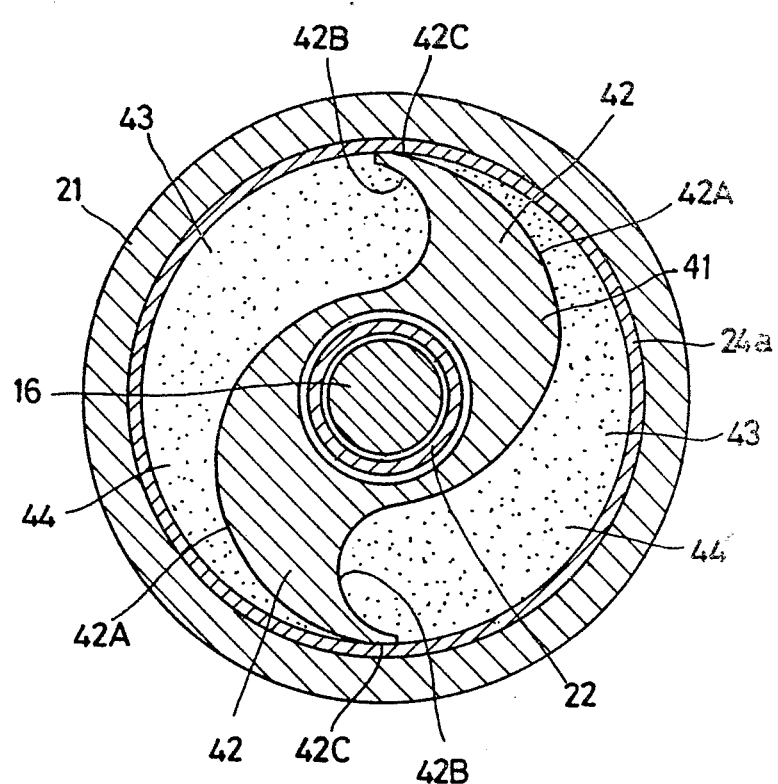
FIG. 2 is a cross-sectional view of the device taken along the line II—II in FIG. 1.

At the bottom portion of bore 26, a cylindrical space 40 is defined between the housing 21 and the piston 24, and a rotor 41 which is slightly smaller in axial width than the cylindrical space 40 is rotatably received within the cylindrical space 40 in order to be in friction or sliding engagement with the flat end surfaces 24b of the piston 24 and the bottom surface 26a of the bore 26. As shown in FIG. 2, the rotor 41 is spline-engaged at its center portion with the outer surface of the cylindrical shaft 22. The rotor 41 is formed with a plurality (two in this illustrated embodiment) of blades 42 which radially outwardly protrude at diametrically opposite sides. Radially outer end surfaces 42C of the blades 42 are in sliding engagement with an axially projected portion 24a of the piston 24 to constitute sealing portions. Thus, the cylindrical space 40 between the piston 24 and the housing 21 is circumferentially divided by the blades 42 into two sector space sections 43. Each of blades 42 is formed with a convexly curved side surface 42A and a concavely curved side surface 42B located at opposite sides in circumferential direction. The two blades form a reversed S-shape as shown in FIG. 2. Each space section 43 is filled up with non-viscous fluid such as air of a predetermined volume percent, for example 5 percent, and high viscous fluid 44 such as silicon oil. The air is filled in the space sections 43 in order to compensate for the thermal expansion of the high viscous fluid 44. The rotor 41 received in the cylindrical space 40 and the high viscous fluid 44 compose the pressure generating section 23.

An end cover 28 is secured to the open end of the bore 26 in order to define a closed luburication oil chamber 27 between the end cover 28 and the piston 24, and a luburication oil is filled in the chamber 27. A plurality of outer clutch plates 37 and inner clutch plates 38 are disposed in alternate fashion to constitute the clutch means 25. The outer clutch plates 37 are spline-engaged with an internal surface of the housing 21, while the inner clutch plates 38 are spline-engaged with a clutch hub 39 attached to the outer surface of the cylindrical shaft 22.

Before the explanation of the overall operation, the reason why the pressure produced at the pressure generating section 23 changes depending upon the rotational direction of the blades 42 with respect to the housing 21 will be now described.

When relative rotation occurs between the first and second rotary shafts 15 and 16, the rotor 41 is relatively rotated within the housing 21, whereby the high viscous fluid 44 in the space section 43 is compulsorily displaced by the blades 42 through between the flat end surfaces 24b of the piston 24 and the flat bottom surface 26a of the bore 26 at a flow rate corresponding to the rotational speed difference. In this case, the viscous friction of the fluid 44 with the bottom surface 26a of the bore 26 and the flat end surface 24a of the piston 24 tends to cause the fluid 44 to remain, whereby a pressure proportional to the rotational speed difference is generated within the space section 43. However, the behavior of the high viscous fluid 44 changes depending upon the rotational direction of the blades 42 with respect to the housing 21.

Namely, when the first shaft 15 rotates faster than the second shaft 16, and thereby driving torque is transmitted from the first shaft 15 to the second shaft 16 (hereinafter referred to as a forward torque transmission ), the blades 42 rotate in the clockwise direction as viewed in FIG. 2 with respect to the housing 21, and thereby the high viscous fluid 44 is displaced by the convexly curved side surface 42A. As a result, the air mixed in the high viscous fluid 44 is gathered to an area adjacent to the concavely curved side surfaces 42B, as shown at 60a in FIG. 3 so that the high viscous fluid 44 is caused to exist in an area of angle $\alpha 1$. The high viscous fluid 44 flows in the same direction as that of the blades 42 in an area close to the blades 42. but flow in the opposite direction in an area close to the axially projected portion 24a of the piston 24 as shown by arrows in FIG. 3. This is caused because the flow speed of the high viscous fluid 44 becomes slower in the area close to the axially projected portion 24a of the piston 24 than that in the area close to the blades 42 because of the viscous friction of the fluid 44 with the axially projected portion 24a.

Figure 4:
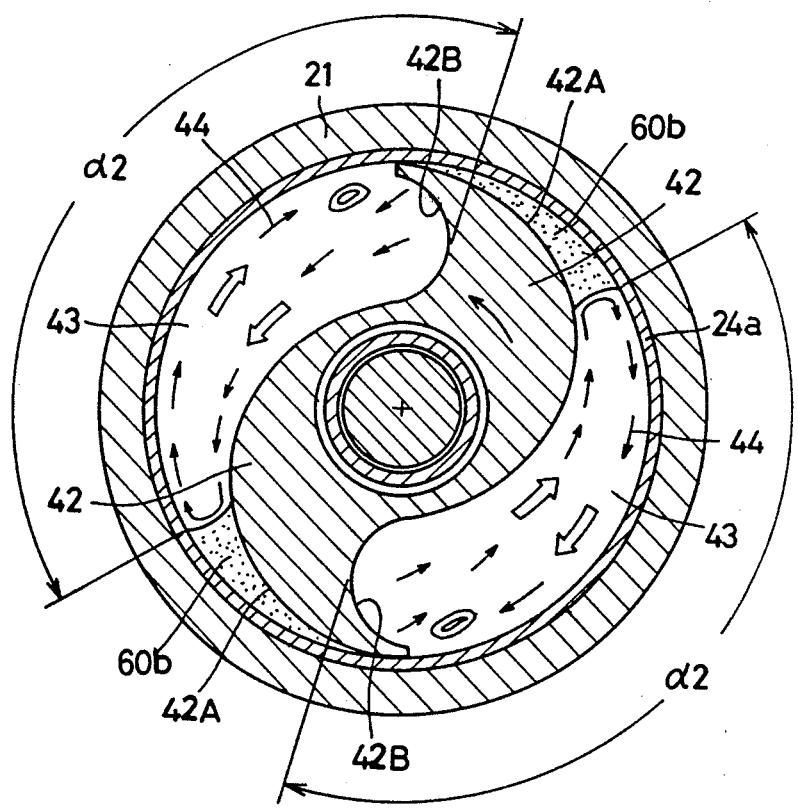
FIG. 4 is an explanatory chart for explaining the behavior of the high viscous fluid filled in the device when a reverse rotational torque is transmitted.

On the contrary, when the first shaft 15 rotates slower than the second shaft 16, and thereby driving torque is transmitted from the second shaft 15 to the first shaft 16 (hereinafter referred to as a reverse torque transmission ), the blades 42 rotate in the counter clockwise direction as viewed in FIG. 2 with respect to the housing 21. As a result, the high viscous fluid 44 is displaced by the concavely curved side surface 42B, and thereby the air mixed in the high viscous fluid 44 is gathered in a wedge-shaped area formed by the convexly curved side surfaces 42A and the axially projected portion 24a, as shown at 60b in FIG. 4. The high viscous fluid 44 flows in the opposite direction in the area close to the axially projected portion 24a of the piston 24 in this case.

Figure 3:
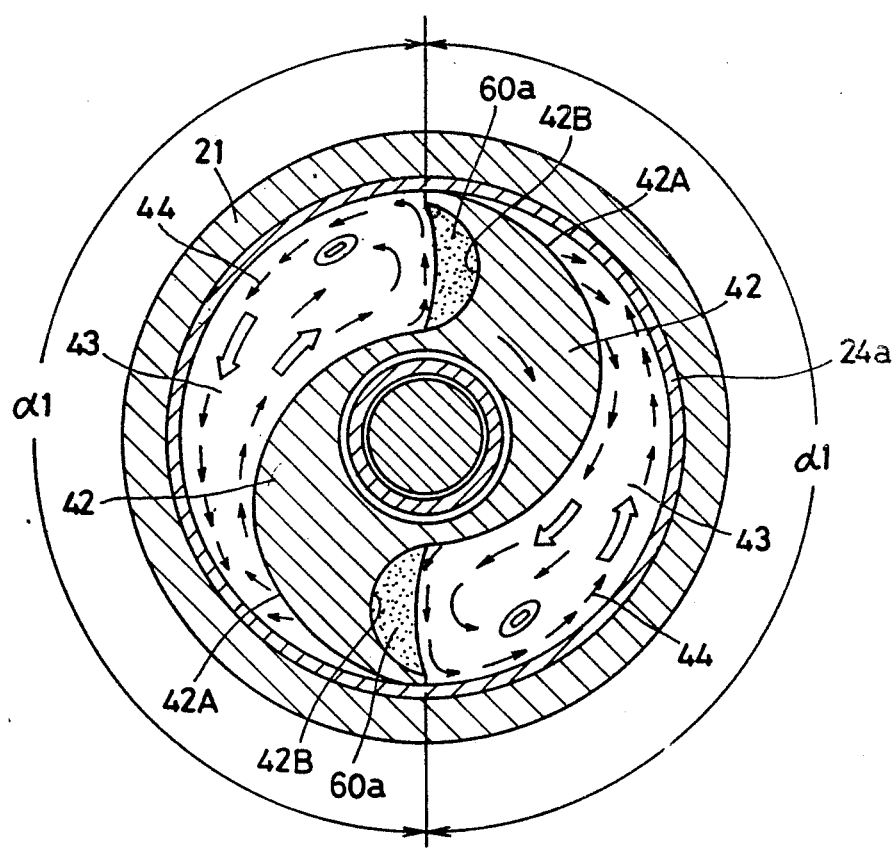
FIG. 3 is an explanatory chart for explaining the behavior of the high viscous fluid filled in the device when a forward rotation torque is transmitted.
Figure 6:
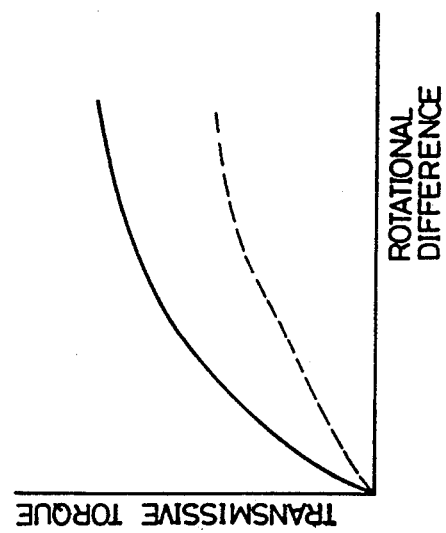
FIG. 6 is a graph showing the transmissive torque characteristic of the device.
Figure 5:
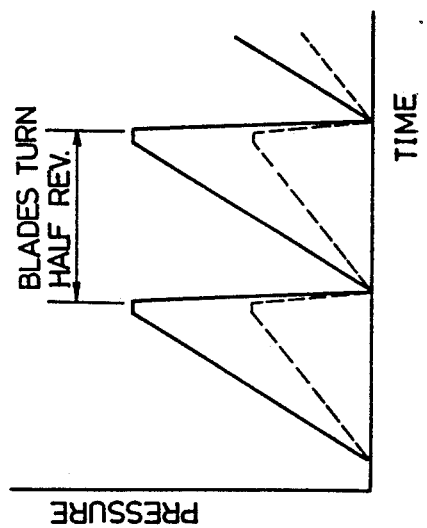
FIG. 5 is a graph showing the pressure generating characteristic of the device.

The air in the wedge-shaped area 60b widely extends along the convexly curved side surfaces 42A as compared with the air in the area 60a shown in FIG. 3, whereby the high viscous fluid 44 is caused to exist in an area of angle $\alpha 2$ smaller than the angle $\alpha 1$. Accordingly, the pressure generating characteristic in the case of reverse torque transmission differs from that in the case of forward torque transmission. The pressure measured at a location close to the axially projected portion 24 in the forward torque transmission is indicated by a solid line in FIG. 5, and the pressure measured at the same location in the reverse torque transmission is indicated by a dotted line in FIG. 5. As the result of above mentioned pressure generating characteristic, the transmissive torque in the reverse torque transmission indicated by a dotted line in FIG. 6 becomes smaller than that in the forward torque transmission indicated by a solid line in FIG. 6.

As described above, by changing the shapes of two opposing side surfaces of the blades 44, the pressure generated in the case of reverse torque transmission becomes lower than that in the case of forward torque transmission.

Operation of the driving power transmission device as constructed above will be described hereinafter.

In the case of forward torque transmission in which the rotor 41 is rotated in the clockwise direction relative to the housing 21, the high viscous fluid 44 is compulsorily displaced in the space section 43 by the the convexly curved side surfaces 42A of the blades 42. In this case, the air mixed in the high viscous fluid 44 is moved forward and gathered in the area 60a adjacent to the concavely curved side surfaces 42B. As a result, the high viscous fluid 44 condensed in the area of angle α1 moves at a relatively high speed to produce a relatively high pressure in proportion to the relative rotational speed of the blades 42, and thereby the piston 24 is pushed toward the clutch means 25 by the relatively high pressure. Accordingly, the plural of outer clutch plates 37 and the inner clutch plates 38 are frictionally engaged with each other by the relatively high pushing force in order to transmit rotational torque from the first rotary shaft 15 to the second rotary shaft 16 through the clutch means 25. The transmissive torque characteristic in the above mentioned forward torque transmission is indicated by the solid line in FIG. 6.

On the contrary, the high viscous fluid 44 is compulsorily moved by the concavely curved side surfaces 42B of the blades 42 during the reverse torque transmission in which the blades 42 rotate in the counter clockwise direction with respect to the housing 21. In this case, the air mixed in the high viscous fluids 44 is gathered in the wedge-shaped area 60b formed between the convexly curved side surfaces 42A and the axially projected portion of the piston 24, thereby the high viscous fluid 44 is condensed in the area of angle α2 smaller than the angle α1. Accordingly, the moving speed of the high viscous fluid 44 within the area of angle α1 becomes slower than the moving speed in the forward torque transmission. As a result, the internal pressure produced at the pressure generating section 23 becomes lower, and thereby the transmissive torque becomes smaller than that in forward torque transmission. The transmissive torque characteristic in the above mentioned reverse torque transmission is indicated by the dotted line in FIG. 6.

Although two blades 42 are formed on the rotor 40 in the above mentioned embodiment, one blade or more than two blades can be formed on the rotor 40.

Obviously, numerous modifications and variations of the present invention are possible in light of the above teachings. It is therefore to be understood that within the scope of the appended claims, the present invention may be practiced otherwise than as specifically described herein.

What is claimed is:

1. A driving power transmission device for transmitting a driving power between first and second shafts comprising:
    a housing connected to said first shaft;
    clutch means received in said housing for transmitting said driving power between said housing and said second shaft when said clutch means is actuated;
    a piston received in said housing for actuating said clutch means, said piston and said housing defining a cylindrical space;
    blade means received in said cylindrical space for rotation in a rotation direction in response to a rotational speed difference between said first and second shafts, the rotational direction being determined by which of the first and second shafts rotates faster than the other of the shafts;
    a high viscous fluid filled in said cylindrical space for displacement by said blade means to generate a pressure for pushing said piston towards said clutch means in said cylindrical space;
    wherein said blade means has at least one blade which extends along a radial direction of the cylindrical space and has first and second side surfaces located opposite one another as viewed in the rotational direction of the blade means, the first and second side surfaces having different shapes for displacing the viscous fluid to change transmissive torque depending upon the rotational direction of the blade means by varying the pressure for pushing said piston towards said clutch means.

2. A driving power transmission device as set forth in claim 1, wherein:
    said at least one blade of said blade means has a convexly curved first side surface and a concavely curved second side surface located opposite one another as viewed in the rotational direction.

3. A driving power transmission device as set forth in claim 2, wherein:
    said high viscous fluid includes non-viscous fluid, volume of which is a predetermined percent of the volume of said cylindrical space occupied by said blade means.

4. A driving power transmission device as set forth in claim 3, wherein:
    said non-viscous fluid is air mixed in said high viscous fluid.

5. A driving power transmission device as set forth in claim 3, wherein:
    said first and second shafts are relatively rotatable about a common axis;
    said clutch means and said blade means are connected to said second shaft through a cylindrical shaft; and
    said second shaft is non-rotatably engaged with said cylindrical shaft.

6. A driving power transmission device as set forth in claim 5, wherein:
    said clutch means consists of a plurality of outer clutch plates engaged with said housing and a plurality of inner clutch plates engaged with said cylindrical shaft, which are disposed in alternate fashion.

* * * * *